United States Patent
Christiansen

(10) Patent No.: US 11,486,366 B2
(45) Date of Patent: Nov. 1, 2022

(54) LIGHTNING PROTECTION SYSTEM FOR A WIND TURBINE BLADE

(71) Applicant: Siemens Gamesa Renewable Energy A/S, Brande (DK)

(72) Inventor: Thomas Lehrmann Christiansen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 295 days.

(21) Appl. No.: 16/607,763

(22) PCT Filed: Jan. 31, 2018

(86) PCT No.: PCT/EP2018/052365
§ 371 (c)(1),
(2) Date: Oct. 24, 2019

(87) PCT Pub. No.: WO2018/206158
PCT Pub. Date: Nov. 15, 2018

(65) Prior Publication Data
US 2020/0056596 A1  Feb. 20, 2020

(30) Foreign Application Priority Data
May 9, 2017 (DE) ............. 10 2017 207 820.0

(51) Int. Cl.
*F03D 80/30* (2016.01)
*B29C 70/48* (2006.01)
(Continued)

(52) U.S. Cl.
CPC ............. *F03D 80/30* (2016.05); *B29C 70/48* (2013.01); *B29C 70/72* (2013.01); *F03D 1/0675* (2013.01);
(Continued)

(58) Field of Classification Search
CPC ....... F03D 80/30; F03D 1/0675; B29C 70/48; B29C 70/72; B29K 2675/00;
(Continued)

(56) References Cited

U.S. PATENT DOCUMENTS

| | | | |
|---|---|---|---|
| 6,979,179 B2 * | 12/2005 | Møller Larsen | F03D 80/30 416/223 R |
| 8,133,031 B2 * | 3/2012 | Arinaga | H02G 13/40 29/889.71 |

(Continued)

FOREIGN PATENT DOCUMENTS

| | | |
|---|---|---|
| CN | 101058236 A | 10/2007 |
| CN | 101559652 A | 10/2009 |

(Continued)

OTHER PUBLICATIONS

International Search Report and Written Opinion of the International Searching Authority dated Apr. 20, 2018 for Application No. PCT/EP2018/052365.

(Continued)

*Primary Examiner* — Aaron R Eastman
(74) *Attorney, Agent, or Firm* — Schmeiser, Olsen & Watts LLP

(57) ABSTRACT

Provided is a rotor blade of a wind turbine, wherein the rotor blade includes a trailing edge section with a trailing edge and a leading-edge section with a leading-edge, a root section with a root and a tip section with a tip, a shell which defines the outer shape of the rotor blade and a cavity which is confined by the shell, and a lightning protection system with an internal down conductor extending from the root section of the rotor blade to the tip section of the rotor blade, wherein the internal down conductor is connectable at the root section to a grounding system of the remainder of the wind turbine and at the tip section to at least one tip lightning receptor which is positioned at the surface of the rotor blade.

(Continued)

In addition, the rotor blade comprises an electrically insulating tip part.

13 Claims, 4 Drawing Sheets

(51) Int. Cl.
    *B29C 70/72*     (2006.01)
    *F03D 1/06*     (2006.01)
    *B29K 675/00*     (2006.01)
    *B29L 31/08*     (2006.01)

(52) U.S. Cl.
    CPC ..... *B29K 2675/00* (2013.01); *B29L 2031/085* (2013.01); *F05B 2230/50* (2013.01)

(58) Field of Classification Search
    CPC ............ B29L 2031/085; F05B 2230/50; F05B 2240/307; F05B 2230/00; B29D 99/0025; Y02E 10/72; Y02P 70/50
    See application file for complete search history.

(56) References Cited

U.S. PATENT DOCUMENTS

| | | | |
|---|---|---|---|
| 11,236,733 B2 * | 2/2022 | Scholte-Wassink | .... F03D 80/60 |
| 2009/0257881 A1 * | 10/2009 | Ostergaard Kristensen | ................ F03D 1/0683 416/229 R |
| 2010/0143145 A1 | 6/2010 | Jones | |
| 2013/0189113 A1 * | 7/2013 | Madsen | ............... B29C 70/887 264/510 |
| 2014/0112787 A1 * | 4/2014 | Bracht | .................... F03D 80/30 416/146 R |
| 2015/0308415 A1 * | 10/2015 | Rajasingam | ...... B29C 66/73141 156/196 |
| 2016/0222945 A1 * | 8/2016 | Shiraishi | ................ F03D 1/0675 |
| 2016/0298608 A1 * | 10/2016 | Whitehouse | ............ F03D 80/30 |
| 2016/0348643 A1 * | 12/2016 | Fujioka | ..................... F03D 9/25 |
| 2018/0135602 A1 * | 5/2018 | Tobin | .................... F03D 1/0675 |
| 2018/0274521 A1 * | 9/2018 | Akhtar | .................... F03D 80/30 |
| 2020/0095983 A1 * | 3/2020 | Girschig | ................. F03D 80/30 |
| 2021/0262434 A1 * | 8/2021 | Okano | .................. F03D 1/0675 |
| 2021/0372374 A1 * | 12/2021 | Murata | ................. F03D 1/0675 |
| 2022/0034305 A1 * | 2/2022 | Aubrion | ................. F03D 80/30 |

FOREIGN PATENT DOCUMENTS

| | | |
|---|---|---|
| CN | 101678616 A | 3/2010 |
| CN | 101749194 A | 6/2010 |
| CN | 201854023 U | 6/2011 |
| EP | 2617555 A1 | 7/2013 |
| JP | 2005113735 A | 4/2005 |
| JP | 2016033365 A | 3/2016 |
| WO | WO 2004043679 A1 | 5/2004 |
| WO | 2018050196 A1 | 3/2018 |
| WO | WO-2018095660 A1 * | 5/2018 ............. F03D 80/30 |

OTHER PUBLICATIONS

Jinpeng, Huang: "Lightning strike analysis and lightning protection system design of large power wind turbine blade"; 1994-2019 China Academic Journal Electric Publishing House; Jun. 5, 2012.
Guo, Kai: "On the Analysis of Blade Lightning Protection Technology in Phase I Project in Xinghe"; (CECEP (Inner Mongolia), Wind-power Co., Ltd., Xinghe 012000; Inner Mongolia, China).

* cited by examiner

LIGHTNING PROTECTION SYSTEM FOR A WIND TURBINE BLADE

CROSS-REFERENCE TO RELATED APPLICATIONS

This application claims priority to PCT Application No. PCT/EP2018/052365, having a filing date of Jan. 31, 2018, which is based on German Application No. 10 2017 207 820.0, having a filing date of May 9, 2017, the entire contents both of which are hereby incorporated by reference.

FIELD OF TECHNOLOGY

The following relates to a rotor blade of a wind turbine with an improved lightning protection system. The following also relates to a method of manufacturing such a rotor blade and to a wind turbine comprising at least one such rotor blade.

BACKGROUND

Wind turbine blades are the most exposed parts of the wind turbine with respect to lightning strikes. Therefore, it is critical that the lightning protection system of a wind turbine blade is properly designed to protect the blade from damage in the event of a lightning strike. This is conventionally done by having an internal down conductor in the blade, which is connected to a grounding system of the remainder of the wind turbine, thus providing a safe path to ground for the lightning current. Attachment points for the lightning—commonly known as lightning receptors—are positioned along the blade surface and are connected to the internal down conductor of the rotor blade. Typically, the internal down conductor contains metal blocks at the receptor positions—so-called receptor blocks—into which the respective lightning receptor are mounted.

In order for the lightning protection system to function properly, it is desired that the lightning protection system is designed in such a way that the lightning always attaches to the lightning receptors, and not to the internal down conductor. A well-known way of ensuring this is to provide sufficient insulation of the internal down conductor. This is especially critical in the outer 1-5 meters of the blade closest to its tip, which will experience the vast majority of lightning strikes. Sufficient insulation may be achieved by encapsulating the internal down conductor in thick insulation material, typically a polymer such as e.g. polyurethane.

Away from the tip section of the blade, the insulation may be provided by using a conventional insulated high voltage cable. The tip section of the blade is conventionally the narrowest part of the blade. This puts limitations to the size, and thereby the insulation strength, of the internal down conductor insulation required in the tip section of the lightning protection system. Furthermore, for blades casted using the integral blade process, the manufacturing method further puts restrictions on the size and geometry of the insulated lightning protection tip part due to the mandrels and vacuum bags required for the process. In addition to this, the insulation of the lightning protection tip part should only introduce a limited increase in total mass of the blade tip, which restricts the insulation volume and/or material.

In consideration of the aforesaid, it is an object of embodiments of the present invention to provide an improved lightning protection system for a rotor blade of a wind turbine. The improved system shall particularly be able to reduce the risk of lightning strikes hitting the internal parts of the lightning protection system, such as the down conductor or receptor blocks, instead of the lightning receptors.

SUMMARY

An aspect relates to a rotor blade of a wind turbine, wherein the rotor blade comprises a trailing edge section with a trailing edge and a leading-edge section with a leading-edge, a root section with a root and a tip section with a tip. The rotor blade also comprises a shell with a suction side shell section and a pressure side shell section, wherein the outer surface of the shell defines the outer shape of the rotor blade and the inner surface of the shell defines a cavity of the rotor blade. Furthermore, the rotor blade comprises a lightning protection system with an internal down conductor extending from the root section of the rotor blade to the tip section of the rotor blade, wherein the internal down conductor is connectable at the root section to a grounding system of the remainder of the wind turbine and at the tip section to at least one tip lightning receptor which is positioned at the outer surface of the rotor blade. In addition, the rotor blade comprises an electrically insulating tip unit, wherein the tip unit is arranged in the tip section of the rotor blade in the cavity of the rotor blade and wherein the tip unit encapsulates at least a part of the internal down conductor in the tip section of the rotor blade. The rotor blade is characterized in that at least a part of the tip unit covers the entire area between a part of the suction side shell portion and a part of the pressure side shell portion, and the connection between the tip unit and the suction side shell portion as well as the connection between the tip unit and the pressure side shell portion is a cast interface, respectively.

A key aspect of embodiments of the present invention is that at least a part of the tip unit covers the entire area between a part of the suction side shell portion and a part of the pressure side shell portion. In other words, the tip unit (or a part thereof) fills the entire cavity of the rotor blade in that section of the rotor blade where the tip unit is situated. As the tip unit advantageously only extends over a relatively small portion of the rotor blade (e.g. over less than three percent of the length of the rotor blade), only relatively small parts of the suction side shell section and the pressure side shell section are directly connected with the tip unit.

An important feature of the rotor blade according to embodiments of the invention is the cast interface between the tip unit and the shell of the rotor blade. A cast interface has the advantage of an improved fixation and an improved sealing joint of the tip unit to the shell of the rotor blade, compared to adhesive joints as disclosed e.g. in the patent applications WO 2015/055214 A1 or WO 2016/074677 A1. This ensures that the risk of e.g. water ingress and consequently corrosion and explosive expansion of water during a lightning strike is minimized. A further advantage is that the electrical insulation properties of the tip unit in the interior of the rotor blade, i.e. in the cavity of the rotor blade, are improved.

The tip unit may exemplarily be a pre-casted component. By pre-casting the tip unit according to the desired blade geometry, and including that tip unit in the blade infusion process, per definition a perfect transition between the blade shell and the insulating tip unit is achieved due to the self-alignment of the parts' interfaces.

Another effect of the coverage of the entire area by at least a part of the tip unit is that the tip unit thus contributes to the stabilization of the rotor blade. The tip unit thus has a structural effect besides the fundamental function to insulate the internal down conductor by means of encapsulation.

In the context of this patent application, the tip section of the rotor blade is defined as that section which extends from the tip of the rotor blade inboard, i.e. towards the root of the rotor blade (the tip of the rotor blade can be seen as the "outermost" point of the rotor blade as seen from the hub, in case that the rotor blade is mounted to a hub of the rotor of the wind turbine). Exemplarily, the tip section of the rotor blade may have an extension of three meters.

Advantageously, the tip unit comprises a tip part which covers the entire area between the leading-edge and the trailing edge of the rotor blade.

In other words, the tip unit advantageously comprises one part which covers the cavity of the rotor blade over the entire chordwise distance. As the shell of the rotor blade, which is typically made of a fiber-reinforced composite laminate, necessarily features a certain thickness, the distance from the leading-edge to the trailing edge in the cavity, i.e. at the inner surface of the shell, is smaller than the distance from the leading-edge to the trailing edge measured at the outer surface of the shell. This is particularly true for the trailing edge section, which is usually designed as a sharp and narrow region, and which could be filled with a so-called trailing edge core.

An advantage of filling the cavity at the entire distance from the leading-edge to the trailing edge is that the stability and stiffening of the rotor blade is even further improved.

In the case that the rotor blade is manufactured according to the vacuum assisted resin transfer molding (VARTM) process, a further advantage of filling the cavity at the entire distance from the leading-edge to the trailing edge is that manufacturing of the rotor blade, i.e. processing, is facilitated. This is due to the fact that otherwise vacuum bags would be required to fill out the relatively narrow space between the tip unit and the leading or trailing edge. By filling the entire cavity from the leading to the trailing edge, this is avoided.

The tip part can be in particular located at the outermost part of the cavity of the rotor blade.

Exemplarily, the tip part has a spanwise dimension of at least 0.1 percent of the length of the rotor blade.

In terms of absolute numbers, the tip part advantageously has a spanwise dimension of at least ten centimeters, in particular of at least twenty centimeters.

In addition, or instead of the tip part, the tip unit may comprise an extension part which covers less than the entire area between the leading-edge and the trailing edge of the rotor blade.

Advantageously, the extension part is located at that region where the side lightning receptors of the lightning protection system of the rotor blade are located. As the side lightning receptors are oftentimes, as a consequence of the motion of the rotor blade, located at the trailing edge section of the rotor blade (motivated by the "hang-on zone" of the lightning), the extension part is located in the trailing edge section of the rotor blade.

Assuming the case that the rotor blade comprises at least one side lightning receptor and that the side lightning receptor is located at the trailing edge section, it is not necessary that the tip unit extends at that section over the entire area from the leading-edge to the trailing edge. With regard to savings in material, which is desirable for cost reduction and weight reduction reasons, it is thus advantageous that the tip unit extends only within a reduced area between the trailing edge and the leading-edge, e.g. only in the trailing edge section.

Exemplarily, the extension part has a spanwise dimension, i.e. lengthwise extension of at least one percent of the length of the rotor blade. The spanwise extension of the extension part is in a range between one percent and ten percent of the total length of the rotor blade.

In another embodiment of the invention, the side lightning receptor is connected with the internal down conductor via a side receptor block. The side receptor block is then encapsulated by the extension part of the tip unit.

Likewise, in another embodiment of the invention, the tip lightning receptor is connected with the internal down conductor via a tip receptor block, which is encapsulated by the electrically insulating tip unit as well.

It is usual to connect lightning receptors via so-called receptor blocks with the internal down conductor. Not only the internal down conductor, but also the receptor block is encapsulated by the electrically insulating material of the tip part.

An attractive choice of a material for the tip unit is a polymer, for example polyurethane.

An important reason to choose a polymer, in particular polyurethane, is its favorable dielectric properties, particularly its high breakdown strength.

Another advantage is that a polymer, in particular polyurethane has a very low electrical conductivity (the electrical conductivity of polyurethane is negligible, such that it is regarded as an electrically insulating material), a low weight (which is important as it is desired to add as little weight as possible to the rotor blade) and is inexpensive.

In another embodiment of the invention, the internal down conductor comprises a high voltage insulation in the section which is adjacent to the tip unit of the rotor blade.

Additionally, in the inboard section of the rotor blade, the internal down conductor may comprise a low voltage insulation. Alternatively, in the inboard section of the rotor blade, the internal down conductor may as well have no specific insulation at all.

The risk of a lightning strike on a rotor blade is generally smaller for sections which are closer to the root of the rotor blade, compared to sections which are further away from the root. Therefore, in practice, it is oftentimes sufficient to only provide, in the inboard section of the rotor blade, a low voltage insulation (or even no specific insulation) for the internal down conductor. In this respect, the wording "low" voltage insulation compares to the "high" voltage insulation of the internal down conductor in mid-board section of the rotor blade and the maximum insulation provided by the provision of the entire encapsulation of the internal down conductor in the outermost section of the rotor blade.

Note that, apart from the reduced risk of lightning strikes in the inboard section of the rotor blade, the internal down conductor is also more protected in the larger cavity of the root section of the rotor blade, compared e.g. to the relatively narrow cavity in the outboard or even tip section of the rotor blade.

Finally, embodiments of the invention are also related to a wind turbine for generating electricity comprising at least one rotor blade as described above.

Another aspect of embodiments of the present invention relates to a method of manufacturing a rotor blade of a wind. The method comprises the following method steps:

a) providing and arranging a fiber-reinforced laminate material in a bottom mold, b) placing the electrically insulating tip unit at the fiber-reinforced laminate material which is arranged in the bottom mold, c) providing and arranging a fiber-reinforced laminate material in an upper mold, and d) casting the rotor blade by application of a resin transfer molding process, such that particularly between the tip unit and the suction side shell portion as well as between the tip unit and the pressure side shell portion a cast interface is formed, respectively.

A resin transfer molding process, in particular a vacuum assisted resin transfer molding (VARTM) process, typically uses a mold tool with a vacuum bag and the use of a vacuum to assist the resin flow. The VARTM process applied to wind turbine rotor blades is also referred to as the "Integral Blade" process. In contrast to this, a rotor blade which is manufactured according to the "butterfly concept" is made of two separately manufactured half shells which are—after casting—bonded together with an adhesive joint.

The embodiments are particularly valuable for a rotor blade being manufactured by the VARTM process. In this manufacturing process, the fiber-reinforced laminate material of the blade shell is not yet stiff and rigid when the two half shells are brought together, as the resin has not yet been injected and, even if some parts of the fiber-reinforced laminate material are pre-impregnated by resin, the resin is in any case not yet cured. Given these facts, the tip unit, which has a solid structure and which is provided exemplarily as a pre-casted component, enables a self-alignment of the tip unit and the surrounding blade shell laminate. In other words, the geometry of the tip section of the rotor blade can be accurately and reliably determined by the tip unit which is placed upon the layout of the laminate blade shell material and to which the upper mold with the laid out laminate blade shell material of the upper shell clings to.

In a conventional rotor blade of a wind turbine, there might also exist pre-casted parts, e.g. the web, the spar caps or root reinforcement parts. These pre-casted parts are inserted into the fiber layout before injection of the resin and curing of the resin. In the tip section of the rotor blade, however, there are usually no pre-casted parts presents. Therefore, a tip unit as disclosed in embodiments of the present invention could contribute in a favorable manner for stabilization and self-alignment of the rotor blade, especially in its tip section.

BRIEF DESCRIPTION

Some of the embodiments will be described in detail, with reference to the following figures, wherein like designations denote like members, wherein.

DETAILED DESCRIPTION

Figure 1:
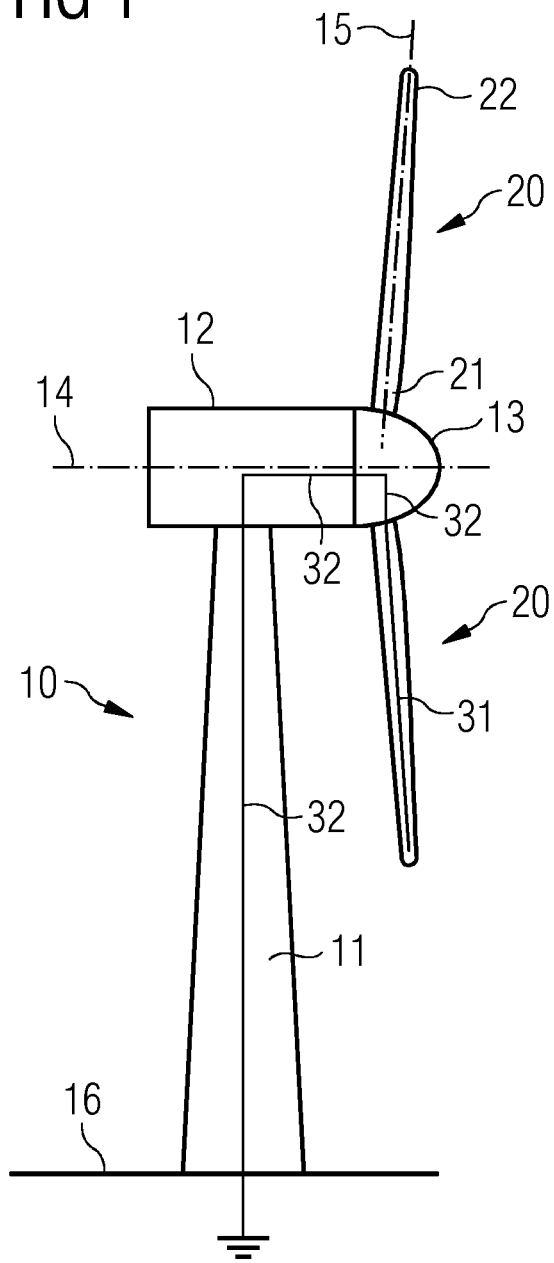
FIG. 1 shows a wind turbine for generating electricity.

FIG. 1 shows a wind turbine 10 for generating electricity. The wind turbine 10 comprises a tower 11. The tower 11 comprises one end by which the tower 11 is connected to the ground 16 and another, opposite end, by which the tower 11 is connected to a nacelle 12 of the wind turbine 10. The nacelle 12 is rotatable mounted with regard to the tower 11. This enables a yaw movement of the nacelle 12 with respect to the tower 11. The nacelle 12 accommodates the generator of the wind turbine and further components of the wind turbine 10. If the wind turbine is a geared wind turbine, the nacelle 12 also may comprise a gear box.

The wind turbine 10 furthermore comprises a rotor which is arranged rotatable with respect to the nacelle 12. The rotor can thus be rotated about a rotor axis 14 which is located substantially horizontal with regards to the ground 16. The rotor of the wind turbine is destined to capture the energy of the wind, transform this energy into a rotational movement and transmit the rotational movement to the generator of the wind turbine. The rotor of the wind turbine comprises a hub 13 and at least one, typically two or three, rotor blades 20. The rotor blades 20 are mounted to the hub 13. Each rotor blade 20 comprises a tip section 22 and a root section 21. Each rotor blade 20 is mounted at its root section 21 to the hub 13. In many current wind turbines, the rotor blades 20 are mounted rotatable to the hub 13. This means that the rotor blade can be pitched about a so-called pitch axis 15 in order to optimize energy capture and loads acting on the rotor blade 20 of the wind turbine 10.

The wind turbine 10 also comprises a lightning protection system. The lightning protection system comprises an internal down conductor 31, extending from the root section 21 of the rotor blade 20 to the tip section 22 of the rotor blade 20. The internal down conductor 31 is connected at the root section 21 of the rotor blade 20 to a grounding system 32 of the remainder of the wind turbine 10. The grounding system 32 transmits the electrical current from the internal down conductor 32 to the ground 16.

Figure 2:
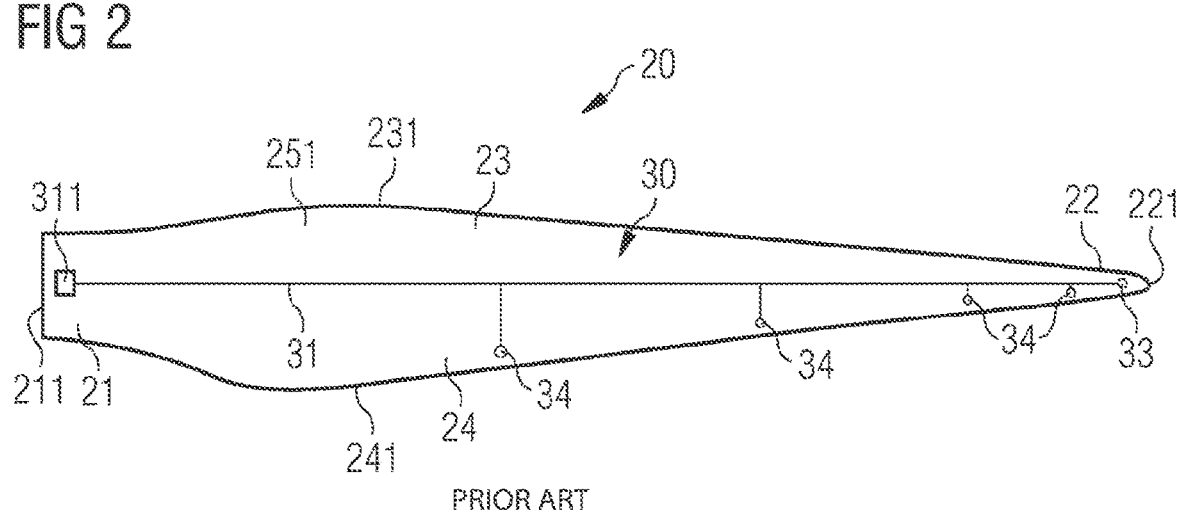
FIG. 2 shows a prior art rotor blade with a lightning protection system.

FIG. 2 illustrates a rotor blade 20 with a lightning protection system 30 according to the state of the art. The rotor blade 20 comprises a root section 21 with a root 211 and at its opposite end a tip section 22 with a tip 221. The distance between the root 211 and the tip 221 is referred to as the blade length 50 or length 50 of the blade 20. The outer shape of the rotor blade 20 is defined by the shell 25 of the rotor blade 20. The shell 25 is typically made of a fiber reinforced composite material which is often times glued to another component such as Balsa wood. This results in a lightweight and stiff structure which can be described as a laminate. The rotor blade 20 comprises a leading-edge section 23 with a leading-edge 231 and a trailing edge section 24 with a trailing edge 241. A chord or chordline is defined by the straight line between the leading-edge 231 and the trailing edge 241 at each spanwise position ranging from the root 211 to the tip 221 of the rotor blade 20. The leading-edge section 23 is defined as that section of the rotor blade 20 which is adjacent until ten percent of the chord length as measured from the leading-edge 231 of the rotor blade 20. Likewise, the trailing edge section 24 is defined as the "last" ten percent in chordwise direction, i.e. the region which is encompassed by ninety percent chord length to one hundred percent chord length. The trailing edge 241 and the leading-edge 231 divide the outer surface 253 of the rotor blade 20 into a suction side and a pressure side. With regard to the shell 25 of the rotor blade 20, a suction side shell section 251 and a pressure side shell section 252 can be assigned to the rotor blade 20. FIG. 2, for example, shows a top view on the suction side shell section 251 of the rotor blade 20.

The lightning protection system 30 comprises an internal down conductor 31 extending from the root section 21 to the tip section 22 of the rotor blade 20. The internal down conductor 31 basically connects the lightning receptors such as the tip lightning receptor 33 and the side lightning receptors 34 to the grounding system 32 of the wind turbine (not shown in FIG. 1). The connection between the internal down conductor 31 of the rotor blade 20 and the grounding system 32 is realized by the root terminal 311. In the case of the exemplary rotor blade as illustrated in FIG. 2, the rotor blade 20 comprises four side lightning receptors 34, each of which is arranged in the trailing edge section 24 of the rotor blade 20 because the lightning will likely attach to this section due to the motion of the rotor blade. Another area where lightning strikes favorably or most commonly hit the rotor blade 20 is its tip section 22. Thus, especially in the tip section 22 of the rotor blade 20 lightning receptors are advantageously provided.

The drawback of a conventional rotor blade 20 with a lightning protection system 30 such as shown in FIG. 2 is that especially in the tip section 22 of the rotor blade 20, the internal down conductor 31 is relatively close to the shell 25 of the rotor blade 20. This is due to the fact that the cavity 26, which is defined by the inner surface 254 of the shell 25, is narrow and small towards the tip section 22 of the rotor blade 20. Thus, especially at the tip section 22 of the rotor blade 20, the internal down conductor 31 is prone to lightning strikes. This is a serious problem because if a lightning strikes directly the internal down conductor 31, the shell 25 of the rotor blade 20 can be damaged which may lead to costly repair works of the wind turbine.

Figure 3:
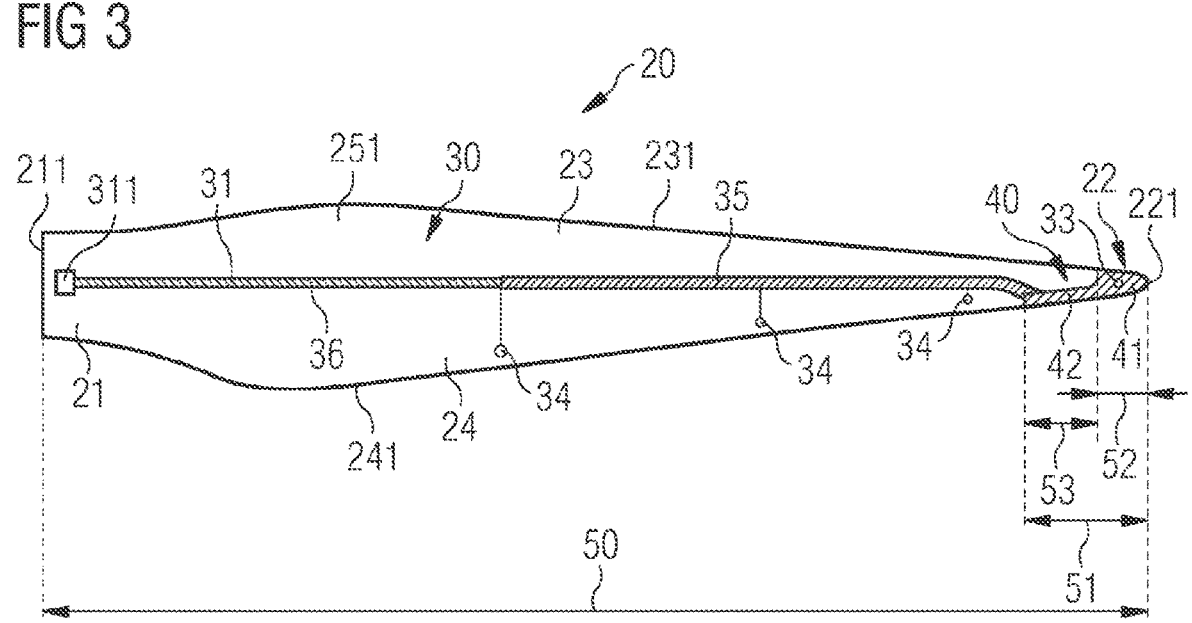
FIG. 3 shows a rotor blade with a lightning protection system according to one embodiment of the invention.

FIG. 3 shows a rotor blade 20 with a lightning protection system 30 according to one embodiment of the invention. The rotor blade comprises a tip unit 40 which is arranged in the tip section 22 and further inboard of the tip section 22. The tip unit 40 encapsulates the internal down conductor 31 at that section of the rotor blade where the tip unit 40 is provided. In other words, the internal down conductor 31 is best possibly insulated against lightning strikes. For this purpose, the tip unit 40 is made of an electrically insulating material.

As for the exemplary known art rotor blade illustrated in FIG. 2, the rotor blade 20 as illustrated in FIG. 3 also comprises exemplarily four side lightning receptors 34, each of which is arranged in the trailing edge section 24 of the rotor blade 20 because the lightning will likely attach to this section due to the motion of the rotor blade.

Furthermore, in the example of FIG. 3, the tip unit 40 comprises a tip part 41 and an extension part 42. The tip part 41 fully extends from the leading-edge 231 to the trailing edge 241 of the rotor blade 20. Additionally, the tip part 41 covers the entire area between the suction side shell section 241 and the pressure side shell section 252. This feature is not visible in FIG. 3 but will be clearer, for example in the context of FIG. 7. The length of the tip unit 40 is composed by the length 52 of the tip part 41 and the length 53 of the extension part 42. Note that the total length 51 of the tip unit 40 is still comparably small, for example less than ten percent of the entire length 50 of the rotor blade 20.

As another measure to protect the internal down conductor 31 with regard to lightning strikes, in a mid-board and outboard part of the rotor blade the internal down conductor 31 is insulated by a high voltage insulation 35. In the inboard part of the rotor blade, where the risk of lightning strikes is smaller, the internal down conductor 31 is only insulated by a low voltage insulation 36. Note that, alternatively, the internal down conductor may as well have no specific insulation at all.

Note that the size of the high voltage insulation 35 and the low voltage insulation 36 is exaggerated in FIG. 3, compared to the size of the tip unit 40 or the rotor blade 20 as a whole. More realistic sizes are depicted in the two concrete embodiments shown in FIGS. 6 and 8.

Figure 4:
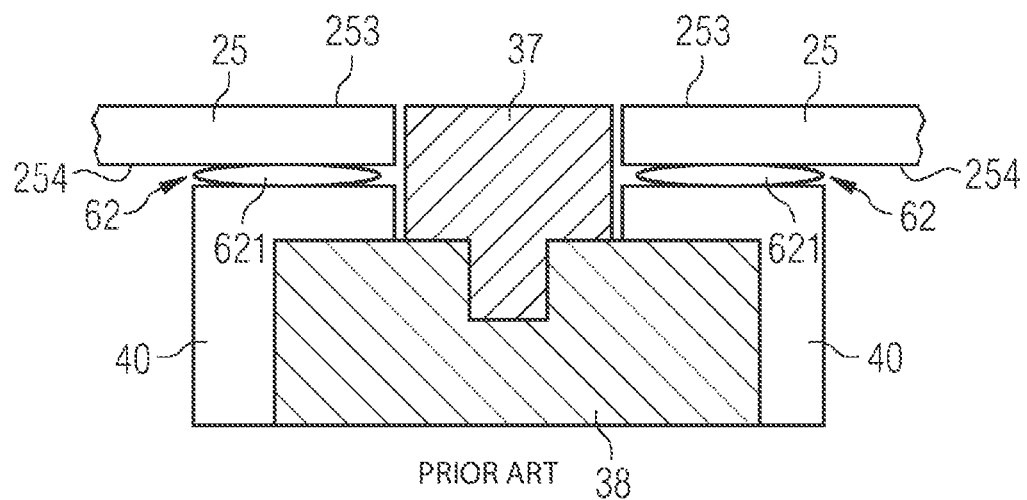
FIG. 4 shows a prior art adhesive joint between a tip unit and the blade shell laminate of a rotor blade.
Figure 5:
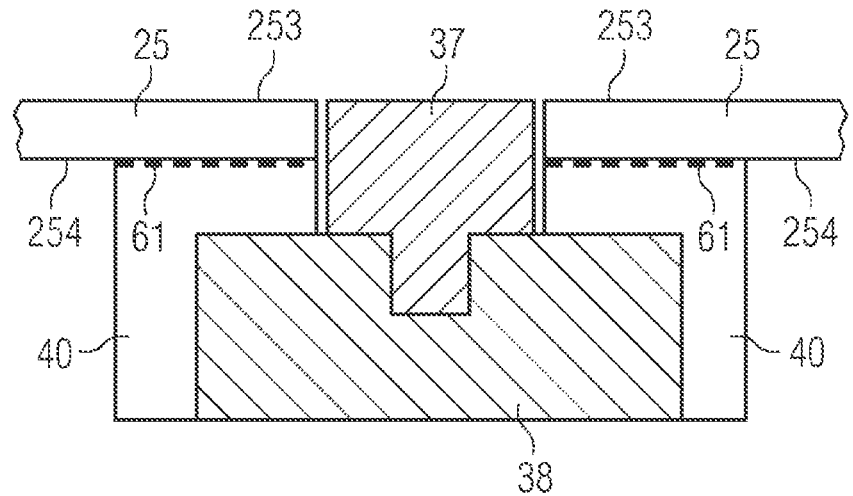
FIG. 5 shows a cast interface between a tip unit and the blade shell laminate of a rotor blade.

FIGS. 4 and 5 show cross-sectional views of a lightning receptor 37 which is connected to a receptor block 38 and wherein the lightning receptor 37 and the receptor block 38 are embedded into a tip unit 40. Also, the tip unit 40 covers the entire area between the inner surface 254 of the shell 25. More precisely, however, the tip unit 40 does not cover the entire area between the blade shell laminates as the tip unit 40 is connected to the inner surface 254 via an adhesive 621. Thus, an adhesive joint 62 is created between the tip unit 40 and the shell 25 of the rotor blade. Such a concept is particularly used in the context of the butterfly manufacturing method for rotor blades of wind turbines, wherein a pre-casted pressure side shell and a pre-casted suction side shell are bonded together. If in this case a tip unit 40 is inserted into the tip section of the rotor blade, this tip unit 40 needs in some way to be rigidly and fixedly attached to the shell 25. Also, a perfect fit of the tip unit 40 into the cavity of the rotor blade is generally not possible and alignment is needed. Thus, a suboptimal connection between the tip unit 40 and the inner surface 254 of the blade shell 25 is achieved. This known art situation is illustrated in FIG. 4.

Note that in FIG. 4 a (generic) lightning receptor 37 and a (generic) receptor block 38 is depicted. The aim of FIGS. 4 and 5 is to illustrate the concept of embodiments of the invention. This concept can in principle be applied to any kind of concrete lightning receptors/receptor blocks, such as e.g. a tip lightning receptor 33 being connected to a tip receptor block 331 or a side lightning receptor 34 being connected to a side receptor block.

In contrast thereto, FIG. 5 shows a connection between the tip unit 40 and the blade shell laminate 25 according to embodiments of the invention. As therein, the tip unit 40 is casted together with the blade shells 25, such that these are self-aligned and a cast interface 61 is created between the tip unit 40 and the shell 25 of the rotor blade 20. This cast interface 61 has, first, the advantage that water ingress between the tip unit 40 and the shell 25 is effectively suppressed and, secondly, the insulation in terms of electrical conductivity between the shell 25 and the tip unit 40 is improved. Thus, the joint or interface between the tip unit 40 and the shell 25 is significantly improved if a concept and set-up as illustrated in FIG. 5 is used.

Figure 6:
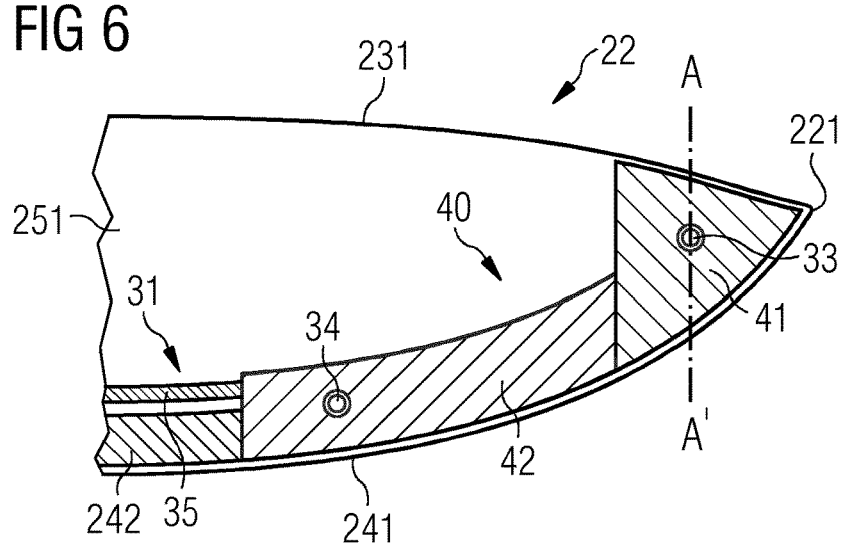
FIG. 6 shows a first embodiment of a tip unit in the top view.

In the following, two concrete embodiments of tip units 40 are shown. FIG. 6 shows a tip unit 40 which comprises a tip part 41 and an extension part 42. The tip part 41 fills the cavity of the rotor blade in the very tip section and fills the entire space between the suction side shell section 251 and the pressure side shell section 252. The tip part 41 also fills the entire space between the leading-edge 231 and the trailing edge 241. The open space between the tip part and the shell is filled by the laminate material of the blade shell itself. Also, a so-called trailing edge core 242 is commonly introduced into the sharp and narrow trailing edge section 24 of the rotor blade. In the rotor blade design according to embodiments of the present invention, the trailing edge core 242 may actually be replaced by the tip unit 40. So, the trailing edge core 242 may only depart from the "root end" of the extension part 42 of the tip unit 40, as seen from the tip 221 of the rotor blade 20. The tip part 41 encapsulates the internal down conductor 31 which is not visible in that section of the rotor blade in FIG. 6. Likewise, the tip part 41 also encapsulates the tip lightning receptor 33. Furthermore, the extension part 42 of the tip unit 40 encapsulates the internal down conductor 31 in that section and also the side lightning receptor 34.

Figure 7:
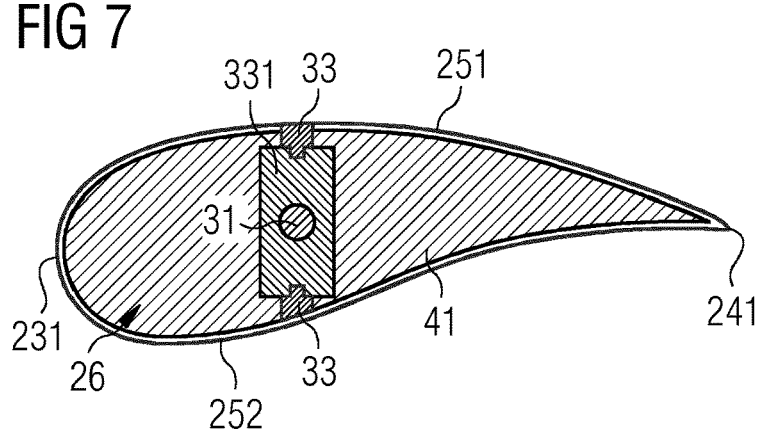
FIG. 7 shows the tip unit according to the first embodiment in a cross-sectional view.

FIG. 7 shows a cross-sectional view at the line A-A' as shown in FIG. 6. In FIG. 7, namely in the cross-sectional view, it can be clearly seen that the tip unit entirely fills the cavity (or "area") of the rotor blade in that section of the rotor blade. It encapsulates a part of the tip lightning receptors 33 (the respective upper part of each tip lightning receptor 33 is not encapsulated, since this is the designated attachment point for the lightning)), the tip receptor block 331 and the internal down conductor 31, the latter being centrally located in the exemplary embodiment illustrated in FIG. 7. Note that two tip lightning receptors 33 are provided, one at the suction side shell portion 251 and one at the pressure side shell portion 252. As the tip part 41 fills the entire space, it adds to the structural stability and has the function of self-alignment of the geometry and the outer shape of the two laminate materials during manufacturing of the rotor blade.

Figure 8:
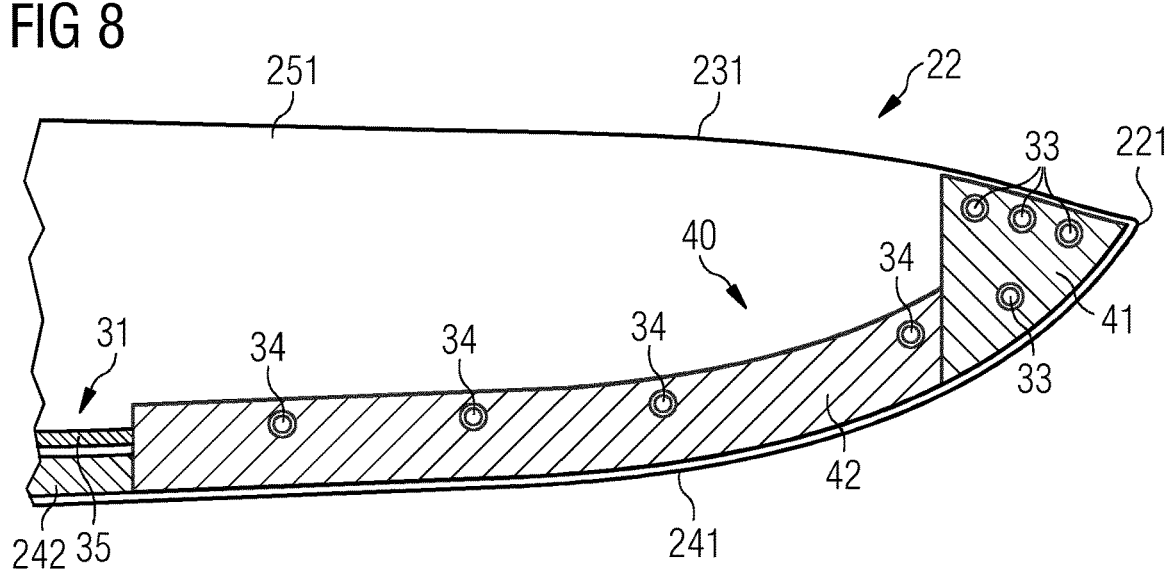
FIG. 8 shows a second embodiment of an inventive tip unit in the top view.

Finally, FIG. 8 shows a second concrete embodiment of the invention with a slightly different design of the tip unit 40. Again, the tip unit 40 comprises a tip part 41 and an extension part 42, wherein the extension part 42 is arranged further inboard relative to the tip part 41. Again, the tip part 41 fully covers and fills the cavity 26 of the rotor blade in that section of the blade. In this case, the rotor blade comprises several tip lightning receptors 33 which are connected to the internal down conductor 31 via respective lightning receptor blocks (not visible in the top view of FIG. 8). These lightning receptor blocks are all encapsulated and best possibly insulated by the tip part 41. Likewise, the embodiment of the rotor blade as shown in FIG. 8 comprises a plurality of side lightning receptors 34, which are also connected to the internal down conductor 31 via respective lightning receptor blocks (also not visible in the top view of FIG. 8). These lightning receptor blocks are all encapsulated by the extension part 42 of the tip unit 40. This ensures an optimum insulation against lightning strikes onto mainly the internal down conductor 31.

As an example of the dimensions of the tip unit 40, assuming a fifty meter long rotor blade, the tip unit 40 may extend between one percent and five percent of the length of the rotor blade; in this case between 50 cm and 2.5 meters.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A rotor blade of a wind turbine, comprising:
   a leading-edge section with a leading edge and a trailing edge section with a trailing edge;
   a root section with a root and a tip section with a tip;
   a shell with a suction side shell section and a pressure side shell section, wherein an outer surface of the shell defines an outer shape of the rotor blade and an inner surface of the shell defines a cavity of the rotor blade;
   a lightning protection system with an internal down conductor extending from the root section of the rotor blade to the tip section of the rotor blade, wherein the internal down conductor is connectable at the root section to a grounding system of a remainder of the wind turbine and at the tip section to an at least one tip lightning receptor which is positioned at the outer surface of the rotor blade; and
   an electrically insulating tip unit, wherein the electrically insulating tip unit is arranged in the tip section of the rotor blade in a cavity of the rotor blade and wherein the electrically insulating tip unit encapsulates at least a part of the internal down conductor in the tip section of the rotor blade, wherein:
      at least a part of the electrically insulating tip unit covers an entire area between a part of the suction side shell portion and a part of the pressure side shell portion, and
      a connection between the electrically insulating tip unit and the suction side shell portion as well as a connection between the electrically insulating tip unit and the pressure side shell portion is a cast interface, respectively;
      the electrically insulating tip unit comprises a tip part which covers the entire area between the leading edge and the trailing edge of the rotor blade.

2. The rotor blade according to claim 1, wherein the electrically insulating tip part has a spanwise dimension of at least 0.1 percent of a length of the rotor blade.

3. The rotor blade according to claim 1, wherein the electrically insulating tip unit comprises an extension part which covers less than the entire area between the leading edge and the trailing edge of the rotor blade.

4. The rotor blade according to claim 3, wherein an extension part is located in the trailing edge section of the rotor blade.

5. The rotor blade according to claim 4, wherein the extension part has a spanwise dimension of at least 0.3 percent of a length of the rotor blade.

6. The rotor blade according to claim 3, wherein the rotor blade comprises at least one side lightning receptor, wherein the at least one side lightning receptor is connected with the internal down conductor.

7. The rotor blade according to claim 1, wherein the electrically insulating tip unit is made of a polymer.

8. The rotor blade according to claim 1, wherein the at least one tip lightning receptor is connected with the internal down conductor via a tip receptor block, which is encapsulated by the electrically insulating tip unit.

9. The rotor blade according to claim 1, wherein the internal down conductor comprises insulation in a section which is adjacent to the electrically insulating tip unit of the rotor blade.

10. The rotor blade according to claim 1, wherein in an inboard section of the rotor blade the internal down conductor comprises insulation.

11. A wind turbine for generating electricity comprising at least one rotor blade according to claim 1.

12. A method of manufacturing a rotor blade of a wind turbine according to claim 1, the method comprising:
   a) providing and arranging a fiber-reinforced laminate material in a bottom mold;
   b) placing the electrically insulating tip unit at the fiber-reinforced laminate material which is arranged in the bottom mold;
   c) providing and arranging a fiber-reinforced laminate material in an upper mold;

d) casting the rotor blade by application of a resin transfer molding process, such that between the electrically insulating tip unit and the suction side shell portion as well as between the electrically insulating tip unit and the pressure side shell portion a cast interface is formed, respectively.

13. The method according to claim 12, wherein the electrically insulating tip unit is a pre-casted component.

\* \* \* \* \*